United States Patent [19]

Materne et al.

[11] Patent Number: 6,158,488

[45] Date of Patent: Dec. 12, 2000

[54] RUBBER COMPOSITION CONTAINING MODIFIED CARBON BLACK AND ARTICLE HAVING COMPONENT THEREOF

[75] Inventors: Thierry Florent Edmé Materne, Fairlawn, Ohio; Giorgio Agostini, Colmar-Berg; Marc Junio, Steinsel, both of Luxembourg

[73] Assignee: The GoodYear Tire & Rubber Company, Akron, Ohio

[21] Appl. No.: 09/168,827

[22] Filed: Oct. 8, 1998

[51] Int. Cl.[7] ............................... B60C 1/00; B60C 11/00
[52] U.S. Cl. ..................... 152/209.5; 152/209.4; 152/905; 524/430; 524/495; 524/496; 524/445; 524/492; 524/493
[58] Field of Search ............... 152/905, 209.5, 152/209.4; 524/430, 495, 496, 492, 493, 445; 523/215, 216, 152, 155, 156, 157

[56] References Cited

U.S. PATENT DOCUMENTS 5,723,529  3/1998  Bernard et al. ..................... 524/492
5,859,120  1/1999  Karl et al. ......................... 524/495
5,967,211  10/1999  Lucas et al. ...................... 152/209.4

FOREIGN PATENT DOCUMENTS 0896978    8/1998   European Pat. Off. .......... C08K 3/04
0905188    9/1998   European Pat. Off. ........ C08L 21/00
01275666A  11/1989  Japan .

OTHER PUBLICATIONS

European Search Report

*Primary Examiner*—James J. Seidleck
*Assistant Examiner*—U. K. Rajguru
*Attorney, Agent, or Firm*—H C Young, Jr.

[57] ABSTRACT

The invention relates to a rubber composition containing a modified silanol-containing carbon black reinforcement which has a grafted hydrocarbon on its surface. The invention also relates to an article such as, for example, a tire having at least one component of such rubber composition.

19 Claims, No Drawings

RUBBER COMPOSITION CONTAINING MODIFIED CARBON BLACK AND ARTICLE HAVING COMPONENT THEREOF

FIELD

The invention relates to a rubber composition containing a modified silanol-containing carbon black reinforcement having hydrocarbon radicals grafted thereon. The invention also relates to an article of manufacture such as, for example, a tire having a component of such rubber composition.

BACKGROUND

Rubber products, including tires, are typically prepared of components of elastomer-based rubber compositions which are reinforced with a particulate carbon black. Sometimes such tire component rubber compositions also contain particulate silica reinforcement.

While carbon black is hydrophobic in nature and has a degree of compatibility with diene-based elastomers, silica (ie: particulate precipitated silica) is hydrophilic, or water absorbing, in nature and is not considered to be as readily compatible with diene-based elastomers Further, compatibility of carbon black to diene-based elastomers is understood to be assisted by typically inherent Van der Waals attractive forces between the carbon black and diene-based elastomer(s) and contributes to the carbon black/elastomer compatibility.

Contrarily, it is understood that there is typically a minimal, if any, interaction of Van der Waals forces between precipitated silica and diene-based elastomer to aid in silica/elastomer compatibility.

In the description of this invention, the term "phr" where used herein, and according to conventional practice, refers to "parts of a respective material per 100 parts by weight of rubber, or elastomer". Usually the terms and percentages used herein are by weight unless otherwise indicated.

In the description of this invention, the terms "rubber" and "elastomer" if used herein, may be used interchangeably, unless otherwise prescribed. The terms "rubber compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which is comprised of, based upon 100 parts by weight elastomer(s), (A) 100 parts by weight of at least one diene-based elastomer, (B) about 30 to about 100, alternatively about 30 to about 90, phr of reinforcing filler composed of (1) about 30 to about 100, alternatively about 30 to about 90, phr of a carbon black which contains a plurality of silanol groups on its surface and which also contains a plurality of hydrocarbon radicals on its surface and (2) about zero to about 70, alternatively about 10 to about 50, phr of at least one reinforcing filler selected from carbon black, precipitated silica, aluminosilicate and silanol-containing carbon black without said grafted hydrocarbon radicals; wherein said grafted hydrocarbon radicals are comprised of at least one of alkyl, aryl, alkaryl and aralkyl radicals; where said alkyl radicals are aliphatic hydrocarbon radicals having from 6 to 18 carbon atoms, where said aryl radicals contain from 6 to 24 carbon atoms, where said alkaryl radicals contain from 12 too 42 carbon atoms and where said aralkyl radicals contain from 12 to 42 carbon atoms.

It is contemplated that the silanol groups on the surface of the silanol-containing carbon black provide such carbon black with a degree of the elastomer reinforcement characteristics often attributed to precipitated silica reinforcement and accordingly promote an aforesaid undesirable hydrophilic property associated with silica reinforcement as well as a reduction in Van der Waals attractive forces between the reinforcing filler and elastomer.

It is contemplated that the presence of the relatively bulky hydrocarbon groups on the modified silanol-containing carbon back surface increases its compatibility with the diene-based elastomer(s) by promoting a reduction its aforesaid undesirable hydrophilic property and an increase in Van der Waals attractive forces between the reinforcing filler and elastomer.

It is estimated, for the purposes of this invention, that from about 5 to about 60 percent of the surface of the carbon black may contain silanol groups, taking into account the irregular, and pore-containing surface of the carbon black. Such surface area of the carbon black is such surface area as may be determined by BET determination.

The BET method of measuring surface area is described, for example, in the *Journal of the American Chemical Society*, Volume 60, page 304 (1930).

For the modified silanol-containing carbon black of this invention, it is contemplated that from about 5 to about 40 percent of its BET determined surface area contains said bulky hydrocarbon groups.

It is contemplated that a ratio of bulky hydrocarbon groups to silanol groups on the surface of the modified carbon black is in a range of about 1/8 to about 8/1.

A significant aspect of this invention is the introduction of relatively bulky hydrocarbon groups onto the surface of a silanol-containing carbon black to counter, or at least reduce, the effect of hydrophilic propensity introduced by the aforesaid silanol groups and to thereby enhance the compatibility of the modified carbon black with diene-based elastomers.

Also, in one aspect, it is contemplated herein that an effect of the presence of the bulky hydrocarbon groups tends to cause the silanol-containing carbon black to have somewhat lower adsorptive interactions (Van der Waals) with diene-based elastomers and, therefore, tend to less effect upon immobilizing an elastomer needed for the good hysteretic properties of its elastomer composition.

As a result, it is envisioned that an enhanced reinforcing filler for diene-based elastomers is provided, as compared to conventional reinforcing carbon blacks and as compared to silanol-containing carbon blacks, without such hydrocarbon group modification.

More specifically, a reduction, or inhibition, of occurrence of Van der Waals forces between the elastomers and carbon black is considered herein to be desirable and beneficial to improve (reduce) hysteretic losses of the rubber composition which is reinforced with such modified carbon black which is predictive of lower rolling resistance of the tire.

The rubber composition itself can also be provided as being a sulfur-cured composition through vulcanization of the uncured elastomer composition. The sulfur curing is accomplished in a conventional manner, namely, by curing under conditions of elevated temperature and pressure for a suitable period of time.

In additional accordance with this invention, an article is provided as being comprised of at least one component of such rubber composition.

In further accordance with this invention, such article is an industrial product selected from hoses and various transmission belts having at least one component of such rubber composition.

In additional accordance with this invention, a tire is provided comprised of at least one component of such rubber composition.

In further accordance with this invention, a tire is provided wherein said component is selected from at least one of a circumferential tread, sidewall, carcass wire coat, carcass ply coat, sidewall apex, sidewall insert and carcass innerliner.

In particular accordance with this invention, a tire is provided having a tread of such rubber composition.

In practice, it is conventionally desired that the elastomer composition contains a coupling agent to aid in coupling said modified carbon black, precipitated silica, aluminosilate and silanol-containing carbon black, as the case may be; wherein said coupling agent has a moiety, preferably a silane moiety, reactive therewith and another moiety interactive with said diene-based elastomer(s). Coupling agents are well known to those having skill in such art for use for such coupling purpose.

For example, such coupling agent may be a bis-(3-alkoxysilylalkyl) polysulfide wherein its polysulfidic bridge contains from 2 to about 6 sulfur atoms selected from (a) said polysulfide having an average of from 2 to about 2.6 or (b) about 3.5 to about 4.5 sulfur atoms in its polysulfidic bridge; wherein the alkyl radicals for the alkoxy component are selected from at least one of methyl and ethyl radicals, and the alkyl radical for the silylalkyl component is selected from ethyl, n-propyl and butyl radicals. For example, such coupling agent may be a bis-(3-triethoxysilylpropyl) polysulfide.

Various diene-based elastomer may be used in the practice of this invention and particularly homopolymers and copolymers of a conjugated dienes such as, for example, 1,3-butadiene and/or isoprene, or a copolymer of the conjugated diene and an aromatic vinyl compound such as, for example, styrene and alpha-methylstyrene, preferably styrene.

Representative examples of such diene-based elastomers are, for example, cis 1,4-polyisoprene (natural and synthetic), cis 1,4-polybutadiene, isoprene/butadiene copolymers, butadiene/styrene copolymers whether prepared by emulsion or organic solvent polymerization, high vinyl polybutadiene having a vinyl 1,2- content in a range of about 30 to about 90 percent, 3,4-polyisoprene, and styrene/isoprene/butadiene terpolymers.

In practice, silanol-containing carbon blacks may be prepared by various means to provide the aforesaid silanol groups on their surfaces.

For example, the silanol-containing carbon black may be treated by sodium silicate solution forming a silicate structure as described in EP-A1-711 805.

Alternatively, the silanol-containing carbon black can be prepared by reacting an organosilane such as, for example, an alkyl alkoxy silane with carbon black at an elevated temperature. Representative of such organosilanes may be, for example, tetraalkoxysilicates such as tetraethyoxysilicate, tetraethoxy titanate, tetraethoxy zirconate and triethoxy aluminate. Alternatively, the silanol-containing carbon black may be prepared by co-fuming an organosilane and oil at an elevated temperature.

At least a portion of the remaining, unmodified surface of the carbon black is modified with said bulky hydrocarbon groups (radicals).

For the modified silanol-containing carbon black of this invention, representative examples of alkyl radical substituents are, for example, tert-butyl, n-hexyl, n-octyl, tert-octyl, hexadecyl and octadecyl radicals and combinations thereof, including alkyl radicals containing up to 18 carbon atoms.

Representative examples of aryl radical substituents for the surface of the carbon black are, for example, phenyl, naphtyl, acetonaphtyl, biphenyl, indoyl and indenyl radicals, and combinations thereof.

Representative examples of alkaryl radical substituents for the surface of the carbon black are, for example, tert-butyl substituted phenyl, naphtyl, acetonaphtyl, biphenyl, indoyl and indenyl radicals; n-hexyl substituted phenyl, naphtyl, acetonaphtyl, biphenyl, indoyl and indenyl radicals; n-octyl substituted phenyl, naphtyl, acetonaphtyl, biphenyl, indoyl and indenyl radicals; tert-octyl substituted phenyl, naphtyl, acetonaphtyl, biphenyl, indoyl and indenyl radicals; hexadecyl substituted phenyl, naphtyl, acetonaphtyl, biphenyl, indoyl and indenyl radicals; and octadecyl substituted phenyl, naphtyl, acetonaphtyl, biphenyl, indoyl and indenyl radicals; and combinations thereof.

Representative examples of aralklyl radical substituents for the surface of the carbon black are, for example, phenyl substituted tert-butyl, n-hexyl, n-octyl, tert-octyl, and hexadecyl radicals; naphtyl substituted tert-butyl, n-hexyl, n-octyl, tert-octyl, and hexadecyl radicals; acetonaphtyl substituted tert-butyl, n-hexyl, n-octyl, tert-octyl, and hexadecyl radicals; biphenyl substituted naphtyl, tert-butyl, n-hexyl, n-octyl, tert-octyl, and hexadecyl radicals; indoyl substituted naphtyl, tert-butyl, n-hexyl, n-octyl, tert-octyl, and hexadecyl radicals; and indenyl substituted naphtyl, tert-butyl, n-hexyl, n-octyl, tert-octyl, and hexadecyl radicals; and combinations thereof.

The modification of the silanol-containing carbon black surface with the bulky hydrocarbon radicals may be accomplished, for example, by grafting the hydrocarbon radicals onto the carbon black surface by free radical generation processes known to those having skill in such art. For example, free radical generators such as peroxides and diazonium salts may be used.

For application of peroxide free radical generation see, for example, *Organic Chemistry* (1987), by K. Peter and C. Vollardt, page 108. For application of diazonium salt free radical generation, see, for example, *Basic Principles of Organic Chemistry* (1964) by J. D. Roberts and M. C. Casario, pages 1137–1139.

Such modification, or grafting, through free radical generation, may be conducted in an organic solvent solution or in an aqueous medium, as desired.

If the modification is to be conducted in an organic solvent solution, representative solvents are, for example, cyclohexane and toluene.

Representative of various diazonium free radical generating agents are, for example, aniline(phenylamine), 4-tert-butylaniline, 4-aminobenzophenone, 2-amino-6-methylheptane, 1-aminopyrene, 1-amino-naphtyl and 2-ethylaniline.

Representative of various peroxide free radical generating agents are, for example, perhydroxy acids such as t-butyl hydroperoxide and benzoicacid hydroperoxide as well as symmetric and asymmetric peroxides such as bis(t-butylperoxy-isopropyl)benzene, t-butylperoxybenzoate, 2,5-dimethyl-2,5-bis(t-butylperoxy)hexane, 1,1'-bis(t-butylperoxy)3,3,5-trimethylcyclohexane, dicumuylperoxide, 2,2'(t-butylperoxy)diisopropylbenzene.

Use of various free radical generating agents for grafting hydrocarbon materials onto various substrates is believed to be well known to those having skill in such art.

Reinforcing carbon blacks and carbon blacks for preparation of modified carbon blacks contemplated for use in this invention are carbon blacks typically suitable for reinforcing elastomers such as, for example, carbon blacks having an Iodine adsorption value in a range of about 40 to about 160 g/kg, a DBP (dibutylphthalate) Number in a range of about 80 to about 180 $cm^3$/100 g and the nitrogen absorption number (BET) in the range of about 50 to about 200 m2/g. Reference may be made to *The Vanderbilt Rubber Handbook* (1990) pages 416–418 for general descriptions of such carbon blacks. Representative of such carbon blacks are, for example, N110, N121, N234, N330, N660 and the like.

The curatives for sulfur curing the rubber composition are curatives conventionally used for sulfur-curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur-curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

The commonly employed siliceous pigments used in rubber compounding applications can be used as the silica in this invention, including pyrogenic and precipitated siliceous pigments, including aluminosilicates, although precipitated silicas are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2$/g). The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300 cc/100 gm.

The silica might be expected to have an average ultimate particle size, for example, in the range of 0.003 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, BV3380GR, etc. and from Huber as Zeopol 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The ingredients are typically mixed in at least two sequential mixing stages, namely, at least one preparative non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 185° C. In the productive mixing stage, the materials may be mixed to a temperature, for example, in a range of from about 110° C. to about 120° C.

The invention may be better understood by reference to the following examples in which the parts and percentages are by weight unless otherwise indicated.

These examples are provided as an exemplary, contemplated practice of the invention.

EXAMPLE I

Carbon black (N234) is modified by being surface treated with an organosilane by the following method:

An oven is purged with a nitrogen to create an inert gaseous atmosphere within the oven.

After gently crushing the carbon black, 0.5 grams of tetraethoxysilane per gram of carbon black are added to the carbon black. The homogenized mixture is then placed in a tempered alumina crucible. The crucible is placed in the oven. The oven is purged with nitrogen from about 30 minutes and then heated up to about 800° C. for about two hours. The crucible is then removed from the oven and the contents cooled to about room temperature which is typically in a range of about 22° C. to about 25° C.

The recovered carbon black is contemplated as containing silanol groups on its outer surface and is, therefore, a silanol-containing carbon black.

The silanol-containing carbon black is modified by grafting a phenyl hydrocarbon radical onto its surface by the use of a diazonium free radical generating compound such as, for example, aniline(phenylamine) in a cyclohexane solvent.

For this Example, it is envisioned that about 5 percent of the surface of the carbon black contains the silanol groups thereon and about 20 percent of the surface of the carbon black contains the bulky hydrocarbon groups on its surface; wherein the surface area of the carbon black is the BET determined surface area.

It is envisioned that the modified carbon black is hydrophilic in nature due to the presence or the bulky hydrocarbon groups (radicals) in its surface in spite of the inclusion of the silanol groups on its surface.

EXAMPLE II

The modified silanol-containing carbon black prepared according to Example I is envisioned as being utilized for reinforcement of a rubber composition for a tire tread according to a recipe demonstrated in the following Table 1.

TABLE 1

| Material | Parts |
|---|---|
| Non-Productive Mix Stages | |
| E-SBR[1] | 25 |
| Isoprene/Butadiene Rubber[2] | 45 |
| Cis 1,4-polybutadiene Rubber[3] | 20 |
| Natural Rubber[4] | 10 |
| Processing Aids[5] | 23.4 |
| Fatty Acid | 3 |
| Silica[6] | Variable |
| Carbon Black[7] | Variable |
| Coupling agent[8] | Variable |
| Productive Mix Stage | |
| Sulfur | 1.5 |
| Zinc Oxide | 2.5 |
| Antioxidant(s)[9] | 3 |
| Sulfenamide and Thiuram Type Accelerators | 1.2 |

[1]Emulsion polymerization prepared SBR by The Goodyear Tire & Rubber Company having styrene content of about 40 percent.
[2]Isoprene/butadiene copolymer elastomer having a Tg of about −45° C. and an isoprene content of about 50 percent by The Goodyear Tire & Rubber Company.
[3]Cis 1,4-polybutadiene rubber as BUDENE ® 1207 by The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 14 parts additional rubber processing oil, plasticizers, resins and waxes are added.
[6]A silica as Z1165 MP by the Rhone Poulenc company.
[7]Carbon black according to Table 2.
[8]A bis-3-(triethoxysilylpropyl) tetrasulfide (50% active) as X50S from Degussa GmbH as a 50/50 blend of the tetrasulfide with N330 carbon black (thus, considered 50% active).
[9]Of the dihydro-trimethyl quinoline type.

The carbon black, silica and silica coupler components of the recipe shown in Table 1 are depicted in the following Table 2.

Composition A is considered as being somewhat of a control since it uses the untreated carbon black and without any silica or silica coupler.

Composition B uses an unmodified carbon black with a silica coupler

Composition C uses the modified carbon black (Example I) and a silica coupler.

Composition D uses silica reinforcement and a silica coupler.

TABLE 2

| | Exp A | Exp B | Exp C | Exp D |
|---|---|---|---|---|
| N234 CB[1] | 73 | 73 | 0 | 0 |
| Treated N234[2] | 0 | 0 | 73 | 0 |
| Silica Coupler[3] | 0 | 3 | 3 | 13.5 |
| Silica[4] | 0 | 0 | 0 | 83 |

[1]Untreated N234 rubber reinforcing carbon black as Vulcan 7H from the Cabot Corporation.
[2]Modified silane-containing carbon black according to Example I.
[4]Blend of bis (3-triethoxy-silylpropoyl) tetrasulfide and carbon black in a 1:1 ratio as X50S from Degussa GmbH.
[4]Silica as Zeosil 1165 MP from the Rhone Poulenc company.

The resulting rubber composition is sulfur-vulcanized in a suitable mold at an elevated temperature in a range of about 150° C. to about 180° C.

EXAMPLE III

A tire of size 195/65R15 is envisioned as being prepared having a tread of the rubber composition of Example II.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition which comprises, based upon 100 parts by weight elastomer(s), (A) 100 parts by weight of at least one diene-based elastomer, (B) about 30 to about 100 phr of reinforcing filler consisting essentially of (1) about 30 to about 100 phr of a modified silanol-containing carbon black which contains (a) a plurality of silanol groups bonded on its surface and (b) a plurality of hydrocarbon radicals grafted on its surface and (2) zero to about 70 phr of at least one reinforcing filler selected from carbon black, precipitated silica, aluminosilicate and silanol-containing carbon black without said hydrocarbon radicals and (C) a coupling agent having a moiety reactive with silanol groups on the surface of said modified carbon black, precipitated silica, aluminosilate and silanol-containing carbon black and another moiety interactive with said elastomer(s); wherein said hydrocarbon radicals are comprised of at least one of alkyl, aryl, alkaryl and aralkyl radicals, where said alkyl radicals are aliphatic hydrocarbon radicals having from 6 to 18 carbon atoms, where said aryl radicals contain from 6 to 24 carbon atoms, where said alkaryl radicals contain from 12 to 42 carbon atoms and where said aralkyl radicals contain from 12 to 42 carbon atoms.

2. The tire of claim 1 wherein, for said rubber composition, said hydrocarbon radicals are selected from at least one of (a) alkyl radicals selected from at least one of t-butyl, n-hexyl, n-octyl, tert-octyl, hexadecyl and octadecyl radicals, (b) aryl radicals selected from at least one of phenyl, naphtyl, acetonaphtyl, biphenyl, indoyl and indenyl radicals, (c) alkaryl radicals selected from at least one of tert-butyl substituted phenyl, naphtyl, acetonaphtyl, biphenyl, indoyl and indenyl radicals; n-hexyl substituted phenyl, naphtyl, acetonaphtyl, biphenyl, indoyl and indenyl radicals; n-octyl substituted phenyl, naphtyl, acetonaphtyl, biphenyl, indoyl and indenyl radicals; tert-octyl substituted phenyl, naphtyl, acetonaphtyl, biphenyl, indoyl and indenyl radicals; hexadecyl substituted phenyl, naphtyl, acetonaphtyl, biphenyl, indoyl and indenyl radicals; and octadecyl substituted phenyl, naphtyl, acetonaphtyl, biphenyl, indoyl and indenyl radicals; (d) aralklyl radicals selected from at least one of phenyl substituted tert-butyl, n-hexyl, n-octyl, tert-octyl, and hexadecyl radicals; naphtyl substituted tert-butyl, n-hexyl, n-octyl, tertoctyl, and hexadecyl radicals; acetonaphtyl substituted tert-butyl, n-hexyl, n-octyl, tert-octyl, and hexadecyl radicals; biphenyl substituted tert-butyl, n-hexyl, n-octyl, tert-octyl, and hexadecyl radicals; naphtyl substituted tert-butyl, n-hexyl, n-octyl, tert-octyl, and hexadecyl radicals; indoyl substituted tert-butyl, n-hexyl, n-octyl, tertoctyl, and hexadecyl radicals; and indenyl substituted tert-butyl, n-hexyl, n-octyl, tert-octyl, and hexadecyl radicals.

3. The tire of claim 1 wherein, for said rubber composition, said aluminosilate is a co-precipitated silicate and aluminate.

4. The tire of claim 2 wherein, for said rubber composition, said aluminosilate is a co-precipitated silicate and aluminate.

5. The tire of claim 1 wherein, for said rubber composition, said silanol-containing carbon black is prepared by reacting an organosilane with a carbon black at an elevated temperature or by co-fuming an organosilane and an oil at an elevated temperature.

6. The tire of claim 2 wherein, for said rubber composition, said silanol-containing carbon black is prepared by reacting an organosilane with a carbon black at an elevated temperature or by co-fuming an organosilane and an oil at an elevated temperature.

7. The tire of claim 1 wherein, for said rubber composition, said coupling agent is a bis-(3-trialkoxysilylalkyl) polysulfide having from 2 to about 6, with an average of about 2 to about 2.6, sulfur atoms in its polysulfidic bridge, wherein the alkyl radical of the alkoxy groups is selected from methyl and ethyl radicals and the alkyl radical of the silylalkyl group is selected from ethyl, n-propyl and butyl radicals.

8. The tire of claim 1 wherein, for said rubber composition, said coupling agent is a bis-(3-trialkoxysilylalkyl) polysulfide having from 2 to about 6, with an average of about 3.5 to about 4.5, sulfur atoms in its polysulfidic bridge; wherein the alkyl radical of the alkoxy groups is selected from methyl and ethyl radicals and the alkyl radical of the silylalkyl group is selected from ethyl, n-propyl and butyl radicals.

9. The tire of claim 7 wherein, for said rubber composition, said hydrocarbon radical for said modified carbon black is an alkyl radical selected from at least one of t-butyl, n-hexyl, n-octyl, tert-octyl, hexadecyl and octadecyl radicals.

10. The tire of claim 8 wherein, for said rubber composition, said hydrocarbon radical for said modified carbon black is an alkyl radical selected from at least one of t-butyl, n-hexyl, n-octyl, tert-octyl, hexadecyl and octadecyl radicals.

11. The tire of claim 1 wherein, for said rubber composition, said hydrocarbon radical for said modified carbon black is an aryl radical selected from at least one of phenyl, naphtyl, acetonaphtyl, biphenyl, indoyl and indenyl radicals.

12. The tire of claim 7 wherein, for said rubber composition, said hydrocarbon radical for said modified carbon black is an alkaryl radical selected from at least one of (a) tert-butyl substituted phenyl, naphtyl, acetonaphtyl, biphenyl, indoyl and indenyl radicals; (b) n-hexyl substituted phenyl, naphtyl, acetonaphtyl, biphenyl, indoyl and indenyl radicals; (c) n-octyl substituted phenyl, naphtyl, acetonaphtyl, biphenyl, indoyl and indenyl radicals; (d) tert-octyl substituted phenyl, naphtyl, acetonaphtyl, biphenyl, indoyl and indenyl radicals; (e) hexadecyl substituted phenyl, naphtyl, acetonaphtyl, biphenyl, indoyl and indenyl radicals; and (f) octadecyl substituted phenyl, naphtyl, acetonaphtyl, biphenyl, indoyl and indenyl radicals.

13. The tire of claim 1 wherein, for said rubber composition, said hydrocarbon radical for said modified carbon black is an aralkyl radical selected from at least one of (a) phenyl substituted tert-butyl, n-hexyl, n-octyl, tert-octyl, and hexadecyl radicals; (b) naphtyl substituted tert-butyl, n-hexyl, n-octyl, tert-octyl, and hexadecyl radicals; (c) acetonaphtyl substituted tert-butyl, n-hexyl, n-octyl, tert-octyl, and hexadecyl radicals; (d) biphenyl substituted tert-butyl, n-hexyl, n-octyl, tert-octyl, and hexadecyl radicals; (e) naphtyl substituted tert-butyl, n-hexyl, n-octyl, tert-octyl, and hexadecyl radicals; (f) indoyl substituted tert-butyl, n-hexyl, n-octyl, tert-octyl, and hexadecyl radicals; and (g) indenyl substituted tert-butyl, n-hexyl, n-octyl, tert-octyl, and hexadecyl radicals.

14. The tire of claim 1 wherein, for said rubber composition, about 5 to about 60 percent of the surface of said modified carbon black contains silanol groups and about 5 to about 40 percent of the surface of said modified carbon black contains said hydrocarbon radicals.

15. The tire of claim 1 wherein, for said rubber composition, the weight ratio of silanol groups to said hydrocarbon radicals on the surface of said modified carbon black is in a range of about 1/8 to about 8/1.

16. The tire of claim 2 wherein, for said rubber composition, about 5 to about 60 percent of the surface of said modified carbon black contains silanol groups and about 5 to about 40 percent of the surface of said modified carbon black contains said hydrocarbon radicals.

17. The tire of claim 12 wherein, for said rubber composition, about 5 to about 60 percent of the surface of said modified carbon black contains silanol groups and about 5 to about 40 percent of the surface of said modified carbon black contains said hydrocarbon radicals.

18. The tire of claim 13 wherein, for said rubber composition, about 5 to about 60 percent of the surface of said modified carbon black contains silanol groups and about 5 to about 40 percent of the surface of said modified carbon black contains said hydrocarbon radicals.

19. The tire of claim 1 wherein, for said rubber composition, diene-based elastomer(s) is selected from at least one of cis 1,4-polyisoprene (natural and synthetic), cis 1,4-polybutadiene, isoprene/butadiene copolymers, butadiene/styrene copolymers whether prepared by emulsion or organic solvent polymerization, high vinyl polybutadiene having a vinyl 1,2-content in a range of about 30 to about 90 percent, 3,4-polyisoprene, and styrene/isoprene/butadiene terpolymers.

* * * * *